United States Patent [19]

Davies et al.

[11] Patent Number: 5,065,784
[45] Date of Patent: Nov. 19, 1991

[54] VALVE ASSEMBLIES AND MEANS

[75] Inventors: Anthony R. Davies, Cirencester; Steven J. Downward, Cheltenham; David Chilvers, Minster Lovell, all of England

[73] Assignee: Smiths Industries public limited company, London, England

[21] Appl. No.: 600,697

[22] Filed: Oct. 22, 1990

[30] Foreign Application Priority Data

Oct. 28, 1989 [GB] United Kingdom ................. 8924318

[51] Int. Cl.⁵ ............................................. F16K 17/18
[52] U.S. Cl. ..................................... 137/116; 137/599
[58] Field of Search ..................... 91/48; 137/116, 599, 137/861

[56] References Cited

U.S. PATENT DOCUMENTS

| | | |
|---|---|---|
| 2,362,713 | 11/1944 | Mott ...................................... 137/116 |
| 2,372,393 | 3/1945 | Ray ............................................ 91/48 |
| 2,517,406 | 8/1950 | Mott ................................... 137/116 X |
| 4,590,958 | 8/1986 | Brunner . |
| 4,633,761 | 1/1987 | Schweikert . |
| 4,635,671 | 1/1987 | Viegas ............................... 137/116 X |
| 4,852,905 | 8/1989 | Tanaka et al. . |
| 4,867,476 | 9/1989 | Yamanaka et al. . |

FOREIGN PATENT DOCUMENTS

| | | | |
|---|---|---|---|
| 70269 | 3/1959 | France .................................. 137/116 |
| 1175840 | 4/1959 | France ..................................... 91/48 |

Primary Examiner—Stephen M. Hepperle
Attorney, Agent, or Firm—Pollock, Vande Sande & Priddy

[57] ABSTRACT

An hydraulic valve assembly controls the supply of hydraulic fluid to an hydraulic strut of a vehicle suspension and is formed in a valve block having an hydraulic delivery line between a pump delivery port and the strut via a check valve which allows flow in one direction only from the pump to the strut. Three parallel hydraulic lines connect the delivery line to a fluid return line. One line has a relief valve that only opens if there is excess pressure in the delivery line. Another line has a series connection of a solenoid-operated pressurizing valve and a pressure-sensing valve. Both valves are normally open, the solenoid-operated valve being closed when the suspension becomes too low, and the pressure-sensing valve closing when pressure at the strut port falls. The other hydraulic line includes a normally-closed solenoid-operated depressurizing valve and a normally-open relief valve. The depressurizing valve is opened when the suspension becomes too high, the relief valve closing when pressure falls to a minimum safe level for the strut.

8 Claims, 2 Drawing Sheets

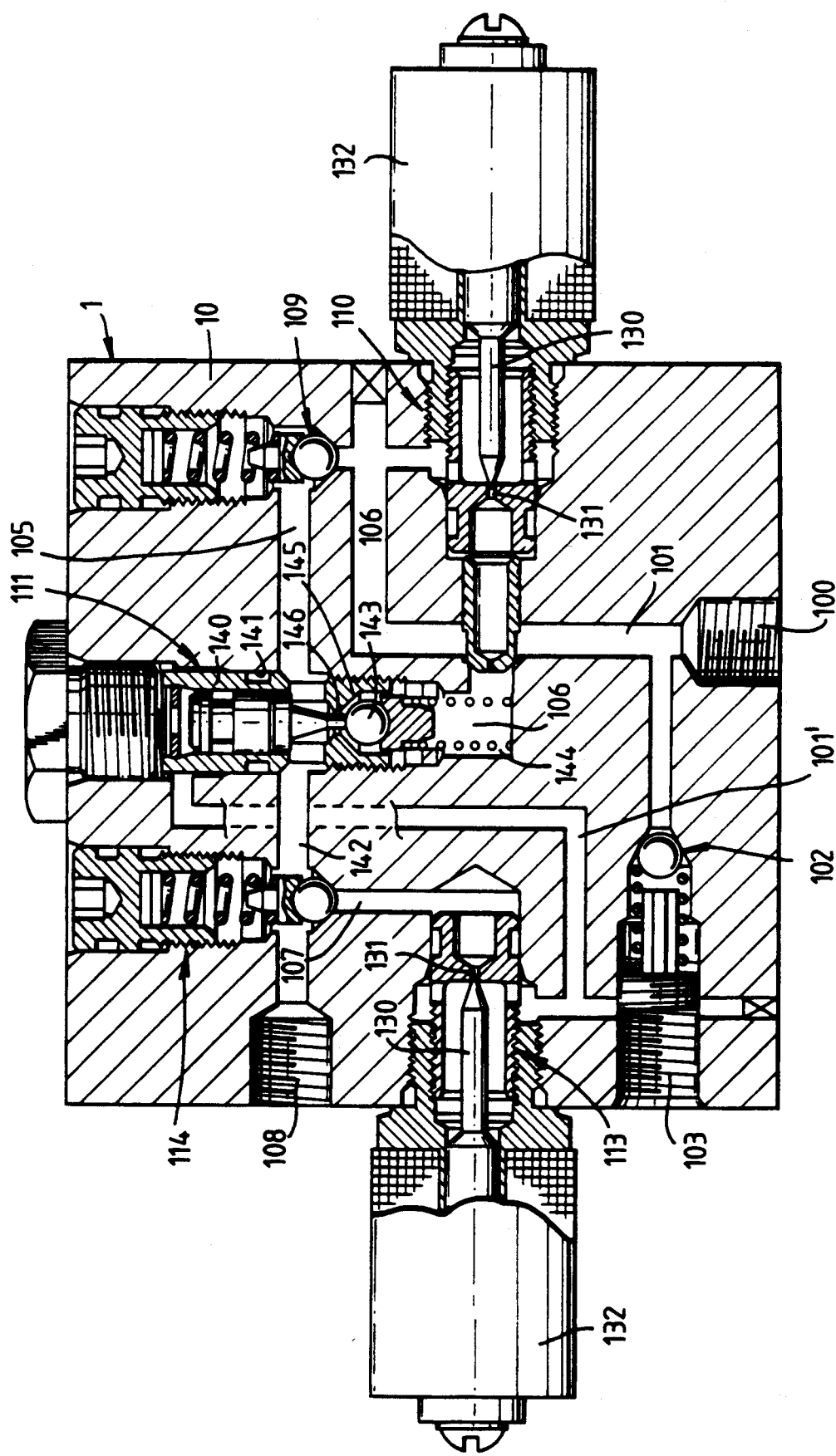

VALVE ASSEMBLIES AND MEANS

BACKGROUND OF THE INVENTION

This invention relates to valve assemblies and valve means.

The invention is more particularly concerned with hydraulic valve assemblies and valve means for use in controlling flow of hydraulic fluid between a source of pressure and an hydraulic strut or the like.

In vehicle leveling systems, an hydraulic strut is connected between the vehicle chassis and suspension to change the height of the suspension relative to the chassis, such as in response to changes in loading of the vehicle. An electrical height sensor detects variation in the height of the vehicle body and this provides an output to the hydraulic system supplying the strut. In addition to adjusting the height, the strut is usually required to provide a shock absorbing function. For this to be effective, there must always be a certain minimum pressure in the strut. There is a tendency for fluid pressure to be lost from these struts over time which requires expensive servicing in order to maintain optimum ride quality.

It is an object of the present invention to provide a valve assembly and valve means that can be used to alleviate this problem.

BRIEF SUMMARY OF THE INVENTION

According to one aspect of the present invention there is provided an hydraulic valve assembly for controlling supply of hydraulic fluid to an hydraulic device, including a first hydraulic line extending between a first port adapted to be connected to a source of hydraulic pressure and a second port adapted to be connected to the hydraulic device, the first hydraulic line including a check valve arranged to enable flow from the first port to the second port but prevent flow from the second port to the first port, a second hydraulic line connected between the first hydraulic line, at a location intermediate the second port and the check valve, and a third port adapted to return hydraulic fluid to a reservoir, the second hydraulic line including a normally-closed depressurizing valve which is openable to enable flow from the second port to the third port, the assembly including a third hydraulic line connected in parallel with the second line between the first hydraulic line at a location intermediate the first port and the check valve, and the third port, the third hydraulic line including normally-open valve means such that fluid from the first port flows to the third port, and the valve means being closable in response to a fall in pressure below a first predetermined level at the second port such that flow is diverted to the second port until pressure at the second port rises above a second predetermined level.

The valve means in the third hydraulic line preferably includes a normally-open pressurizing valve and a normally-open pressure sensing valve connected in series, the pressure sensing valve being arranged to close in response to a fall in pressure at the second port, and the pressurizing valve being also closable such that closure of either the pressurizing valve or the pressure sensing valve prevents flow along the third hydraulic line and diverts flow to the second port. The pressurizing valve and the depressurizing valve in the second hydraulic line may be solenoid operated.

The second predetermined level of pressure is preferably greater than the first predetermined level of pressure.

The valve means in the third hydraulic line preferably includes a normally-open pressure sensing valve, the pressure sensing valve including a piston member displaceable along a bore in accordance with pressure difference across the piston member, the piston member having a valve member at one end, a valve seat and a resilient means urging the valve member towards the seat, the assembly including means supplying pressure from the hydraulic device to the pressure sensing valve to establish a pressure difference across the piston member which acts against the resilient means and is normally sufficient to hold the valve member away from the seat but allows the valve member to contact the seat when the pressure from the hydraulic device falls below the first predetermined level, thereby closing the valve means, and the effective pressure sensing area of the piston member being reduced when the valve member is seated such that the valve means will only open again when the pressure from the hydraulic device rises to the second predetermined level.

The valve member may be a ball and the valve seat be of frusto-conical shape.

The second hydraulic line preferably includes a relief valve connected in series with the depressurizing valve, the relief valve being arranged to close when pressure in the second hydraulic line falls below a third predetermined level. The valve assembly may also include a fourth hydraulic line connected in parallel with the second and third lines between the first and third ports, the fourth line including a normally-closed relief valve which opens to allow flow from the first to the third port when pressure at the first port rises above a fourth predetermined level. The hydraulic lines may be provided in a valve block, the check valve, depressurizing valve and the valve means being mounted in the valve block.

According to another aspect of the present invention there is provided valve means for ensuring a minimum pressure level in an hydraulic device, the valve means adapted for connection in an hydraulic line between a pressure source and the hydraulic device such that, when the valve means is open, flow from the source is diverted away from the device and, when closed, flow passes from the source to the device, the valve means including a piston member displaceable along a bore in accordance with pressure difference across the piston member, the piston member having a valve member at one end, a valve seat and resilient means urging the valve member towards the seat, means supplying pressure from the hydraulic device to the valve means to establish a pressure difference across the piston member which acts against the resilient means and is normally sufficient to hold the valve member away from the seat but allows the valve member to contact the seat when the pressure from the hydraulic device falls below a first predetermined level, thereby closing the valve member, and the effective pressure sensing area of the piston means being reduced when the valve member is seated such that the valve means will only open again when pressure from the hydraulic device rises to a second predetermined level greater than the first level.

According to a further aspect of the present invention there is provided an hydraulic valve assembly including valve means according to the above other aspect of the invention.

A valve assembly for a vehicle suspension leveling system including a valve, in accordance with the present invention, will now be described, by way of example, with reference to the accompanying drawings.

BRIEF DESCRIPTION OF THE DRAWINGS

FIG. 2 is a cross sectional view of the valve assembly.

DESCRIPTION OF THE PREFERRED EMBODIMENTS

Figure 1:
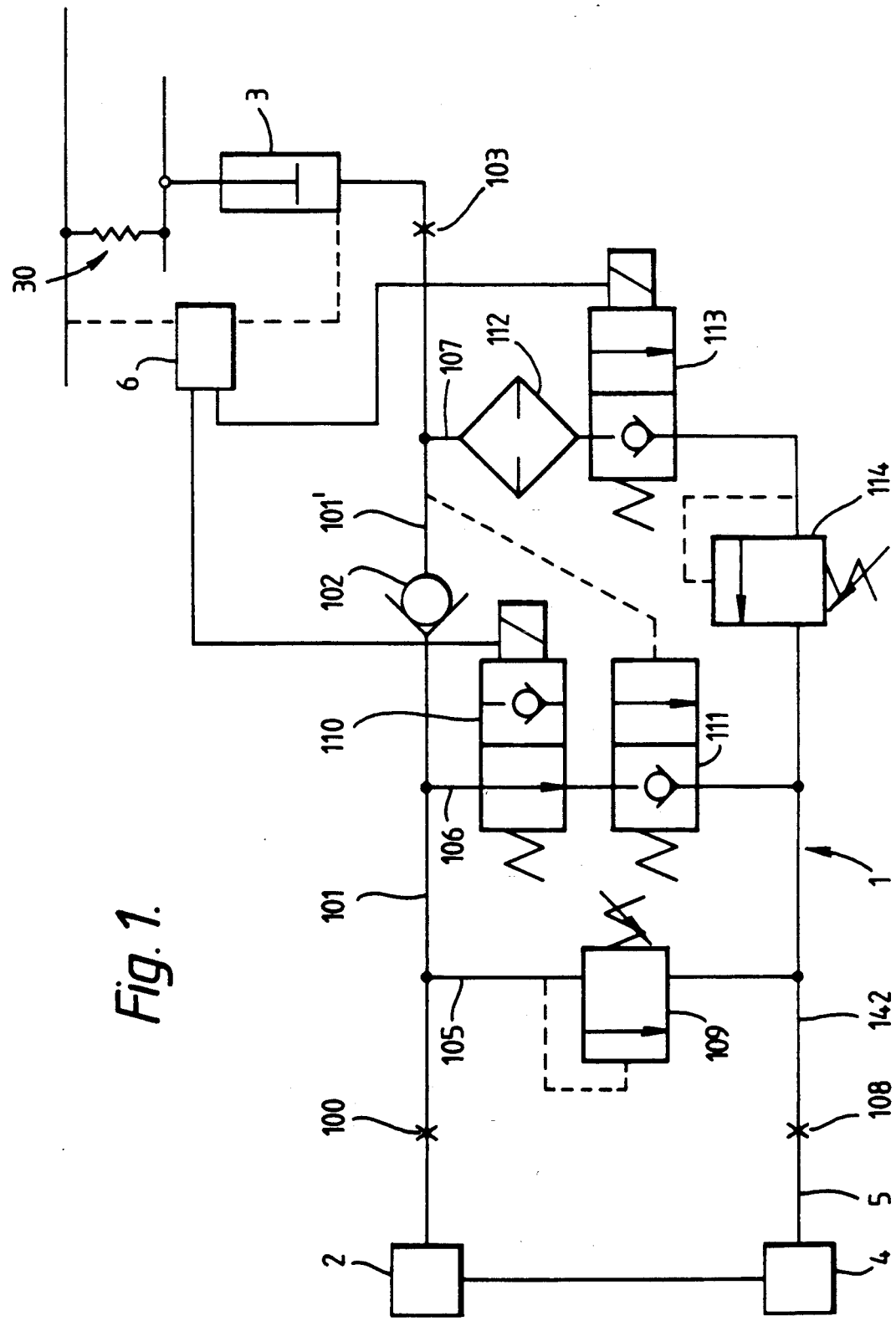
FIG. 1 shows the valve assembly and leveling system schematically.

With reference first to FIG. 1, the hydraulic valve assembly 1 is connected between an hydraulic pump 2 and an hydraulic strut 3 which is coupled mechanically to a vehicle suspension system 30. The pump 2 is coupled to a tank 4 of hydraulic fluid the tank return line 5 of which is also coupled to the valve assembly 1.

The valve assembly 1 has a pump delivery port 100 which is connected via an hydraulic delivery line 101 and a one way, check valve 102 to a strut port 103. Three separate, parallel hydraulic lines 105, 106 and 107 connect the delivery line 101 to a tank return port 108 via a return line 142.

Line 105 is connected directly between the pump delivery port 100 and the tank return port 108 and includes a system relief valve 109 which is normally closed. The relief valve 109 opens in response to a pressure difference between line 101 and the tank return port 108, which is greater than a predetermined amount.

Line 106 is connected to line 101 at a location between the delivery port 100 and the check valve 102 and includes two valves 110 and 111 connected in series such that, if either valve is closed, flow along line 106 is prevented. The valve 110, closer the line 101, is a solenoid-operated, pressurizing valve which is normally open. The solenoid-operated valve 110 is controlled by signals from a height sensor unit 6 which detects change in the level of the vehicle suspension 30. The other valve 111 is a pressure-sensing valve responsive to pressure in that part of line 101 between the check valve 102 and the strut port 103. The pressure-sensing valve 111 is also normally open so that flow from the pump 2 flows along line 106 to the tank return port 108. When pressure at the strut port 103 falls, this causes the pressure-sensing valve 111 to close. Instead of a pressure-sensing valve, it would be possible to use an electrical pressure sensor in line 101 which controls operation of the pressurizing valve 110.

The third, parallel line 107 is connected to line 101 at a location between the check valve 102 and the strut port 103 and includes a series arrangement of a filter 112, a solenoid-operated depressurizing valve 113 and a low pressure relief valve 114. The depressurizing valve 113 is controlled by the height sensor 6 and is normally closed so that flow is prevented along line 107.

When the vehicle suspension is at the correct height, both of the solenoid-operated valves 110, and 113 are deenergized so that the pressurizing valve 110 is open and the depressurizing valve 113 is closed. Flow from the pump 2 then passes via line 106 to the port 108 and the tank 4.

If the vehicle suspension 30 becomes too low, this is detected by the height sensor unit 6 which energizes the solenoid of the pressurizing valve 110. This causes valve 110 to close, thereby preventing flow along line 106 and causing a build up of pressure at the pump delivery port 100. When the pump delivery pressure exceeds the strut pressure, the check valve 102 opens to allow flow to the strut port 103 and hence to the strut 3. This produces an increase in the height of the vehicle suspension 30 until the desired height is reached. The unit 6 then deenergizes the valve 110 and allows flow from the pump 2 directly to the tank 4. Excess pressure in line 101 is prevented by the relief valve 109 which will open to divert flow to the tank 4 if the maximum pressure of the system is exceeded.

If the vehicle suspension becomes too high, this is detected by the unit 6 which causes the solenoid of the depressurizing valve 113 to be energized. This allows flow from the strut port 103 to the tank 4 via the filter 112, an orifice in the valve 113 and the relief valve 114. Once the strut pressure falls to that of the relief valve 114, the relief valve closes to prevent further flow along line 107, even if the valve 113 is still open. This ensures that there is always a predetermined minimum pressure in the strut 3 to ensure that the strut provides some shock absorbing properties for the vehicle suspension 30.

If the pressure in the strut 3 ever falls below this minimum pressure, the drop in pressure on line 101, between the check valve 102 and the strut port 103 will be sensed by the pressure sensing valve 111 which responds by closing. This prevents flow along line 106, allowing pressure to build up at the pump delivery port 100 until it is sufficient to pass the check valve 102 and be supplied to repressurize the strut 3. When the strut pressure reaches a level determined by the pressure sensing valve 111, the valve will open again to divert flow to the tank. In this way, a minimum pressure is always maintained in the strut 3, sufficient to ensure that the strut provides effective shock absorbing qualities. The construction of the pressure sensing valve 111 is such that the pressure required to open the valve is greater than that required to close it, so that it does not keep changing between open and closed status when the pressure in the strut is around its minimum level. This will become apparent from the description below of the construction of the valve assembly with reference particularly to FIG. 2.

The valve assembly 1 has a machined aluminum valve block 10 in which are mounted the various components and which provides the hydraulic lines 101, 105, 106 and 107 between the pump delivery port 100, the strut port 103 and the tank return port 108. The check valve 102 and the relief valves 109 and 114 are conventional, spring-loaded ball valves. The solenoid-operated valves 110 and 113 both have tapered needle valves 130 which are moved into or out of an orifice 131 under control of a solenoid 132 so as to prevent o enable flow through the orifice.

The pressure sensing valve 111 is of a novel construction. At its upper end, the valve 111 has a piston 140 which is movable along a bore 141. The upper end of the piston 140 is acted on by pressure from the strut port 103 supplied via a part 101' of line 101. The bore 141 communicates, at its lower end, with the tank return port 108 via the return line 142 so that lower end of the piston 140 is acted on by pressure in this line. The lower end of the piston contacts a valve member in the form of a ball 143 which is urged upwardly by a helical spring 144. The piston 140 holds the ball 143 below a frustoconical valve seat 145 which has a central aperture 146 that provides a part of line 106. In this position, hydraulic fluid flows upwardly around the ball 143, through the aperture 146 and via line 142 to the tank return port 108. When pressure drops at the strut port 103 below its minimum, the pressure at the top of the piston 140 becomes less than the total upward pressure exerted on it by the spring 144 and the fluid pressure in lines 142 and 106. This causes the piston to move up and the ball 143 to contact its seat 145, thereby sealing closed line 106. Once the valve 111 has closed, the effective pressure sensing area is reduced by an amount equal to the seating area of the ball 143. This is because the total force exerted by the fluid pressure around the ball will be reduced when the ball is seated and this reduction is in the downward component of the force, so that there is a net increase in the upward component. In this way, the strut pressure will have to rise to a value above the valve closing pressure before the valve 111 will open again. This ensures that the valve 111 does not repeatedly open and close when pressure in the strut 3 is around its minimum level.

The pressure sensing valve 111 can be used in other applications where it is necessary to ensure a minimum pressure level in a pressure device, which could, for example, be a pressure accumulator.

What we claim is:

1. An hydraulic valve assembly for controlling supply of hydraulic fluid between a source of hydraulic pressure, an hydraulic device, and a reservoir, the assembly comprising: a first port connected to said source; a second port connected to said device; a third port connected to the reservoir; a first hydraulic line extending between said first port and said second port, the first hydraulic line including a check valve, the check valve enabling flow from the first port to the second port but preventing flow from the second port to the first port; a second hydraulic line connected between the third port and the first hydraulic line at a location intermediate the second port and the check valve, the second hydraulic line including a normally-closed depressurizing valve which is openable to enable flow from the second port to the third port; and a third hydraulic line connected in parallel with the second hydraulic line between the third port and the first hydraulic line at a location intermediate the first port and the check valve, the third hydraulic line including a normally-open solenoid operated pressurizing valve connected in series with a normally open pressure sensing valve such that fluid from the first port normally flows to the third port, the pressure sensing valve in the third line being closed in response to a fall in pressure at the second port below a first predetermined level and the pressurizing valve also being closable such that closure of either the pressurizing valve or the pressure sensing valve prevents flow along the third hydraulic line and diverts flow to the second port until pressure at the second port rises above a second predetermined level.

2. An hydraulic valve assembly according to claim 1, wherein the depressurizing valve in the second hydraulic line is a solenoid-operated valve.

3. An hydraulic valve assembly according to claim 1, wherein said second predetermined level of pressure is greater than said first predetermined level of pressure.

4. An hydraulic valve assembly according to claim 3, wherein said pressure sensing valve comprises: a bore, a piston member displaceable along the bore in accordance with pressure difference across the piston member, the piston member having a valve member at one end, a valve seat and a spring, said spring urging the valve member towards the seat, wherein the assembly includes means supplying pressure from the hydraulic device to said pressure sensing valve to establish a pressure difference across the piston member which acts against the spring and is normally sufficient to hold the valve member away from the seat but allows the valve member to contact the seat when the pressure from the hydraulic device falls below said first predetermined level, thereby closing the valve, and wherein the effective pressure sensing area of the piston member is reduced when the valve member is seated such that the valve will only open again when the pressure from the hydraulic device rises to said second predetermined level.

5. An hydraulic valve assembly according to claim 4, wherein the valve member is a ball and the valve seat is of frusto-conical shape.

6. An hydraulic valve assembly according to claim 1, wherein the second hydraulic line includes a relief valve, connected in series with the depressurizing valve, and wherein the relief valve closes when pressure in the second hydraulic line falls below a third predetermined level.

7. An hydraulic valve assembly according to claim 1, wherein the assembly includes a fourth hydraulic line connected in parallel with the second and third lines between the first and third ports, and wherein the fourth line includes a normally-closed relief valve which opens to allow flow from the first to the third port when pressure at the first port rises above a fourth predetermined level.

8. An hydraulic valve assembly according to claim 1, wherein said first, second and third hydraulic lines are provided in a valve block, and wherein the check valve, depressurizing valve and said valves in said third hydraulic line are mounted in the valve block.

* * * * *